(12) United States Patent
Tola

(10) Patent No.: US 6,703,829 B2
(45) Date of Patent: Mar. 9, 2004

(54) MAGNETIC POSITION SENSOR

(76) Inventor: Jeff Tola, 2242 N. Third Ave., Upland, CA (US) 91784

( * ) Notice: Subject to any disclaimer, the term of this patent is extended or adjusted under 35 U.S.C. 154(b) by 0 days.

(21) Appl. No.: 10/236,532

(22) Filed: Sep. 6, 2002

(65) Prior Publication Data

US 2003/0048101 A1 Mar. 13, 2003

Related U.S. Application Data

(60) Provisional application No. 60/318,111, filed on Sep. 7, 2001.

(51) Int. Cl.$^7$ .................................................. G01B 7/30
(52) U.S. Cl. .............................. 324/207.25; 324/207.2; 324/207.21; 335/302
(58) Field of Search .................... 324/207.2, 207.21, 324/207.22, 207.25; 340/672; 335/302

(56) References Cited

U.S. PATENT DOCUMENTS

| | | |
|---|---|---|
| 3,012,177 A | 12/1961 | Mortimer |
| 4,415,856 A | 11/1983 | Welles |
| 4,490,674 A | 12/1984 | Ito |
| 4,603,295 A * | 7/1986 | Heemstra ............... 324/207.19 |
| 4,810,965 A | 3/1989 | Fujiwara et al. |
| 5,055,781 A | 10/1991 | Sakakibara et al. |
| 5,159,268 A | 10/1992 | Wu |
| 5,332,965 A | 7/1994 | Wolf et al. |
| 5,428,290 A | 6/1995 | Porcher |
| 5,444,369 A | 8/1995 | Luetzow |
| 5,512,820 A | 4/1996 | Alfors |
| 5,521,495 A | 5/1996 | Takahashi et al. |
| 5,544,000 A | 8/1996 | Suzuki et al. |
| 6,130,535 A | 10/2000 | Herden et al. |
| 6,137,288 A | 10/2000 | Luetzow |
| 6,201,388 B1 | 3/2001 | Pecheny et al. |
| 6,232,771 B1 | 5/2001 | Herden et al. |
| 6,310,473 B1 | 10/2001 | Zhao |

FOREIGN PATENT DOCUMENTS

DE    19757116 A1    6/1999

* cited by examiner

*Primary Examiner*—N. Le
*Assistant Examiner*—Darrell Kinder
(74) *Attorney, Agent, or Firm*—Woodard, Emhardt, Moriarty, McNett & Henry LLP

(57) ABSTRACT

A magnetic position sensor including a magnet and a magnetic flux sensor. The magnet comprises a ring segment having a length and is polarized in a direction of magnetization extending generally along the length of the ring segment to generate a magnetic field. The magnetic flux sensor is disposed within the magnetic field and is operable to sense varying magnitudes of magnetic flux density during relative rotational movement between the magnetic field and the magnetic flux sensor.

35 Claims, 7 Drawing Sheets

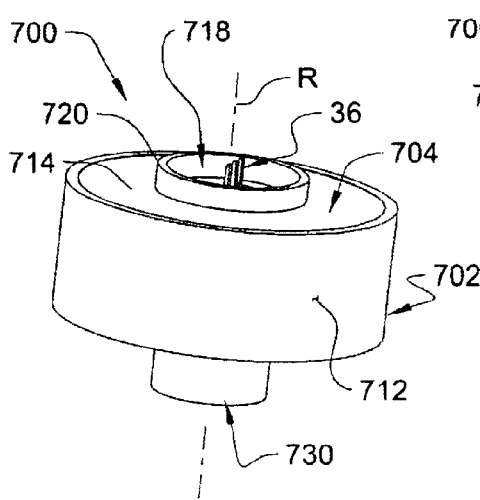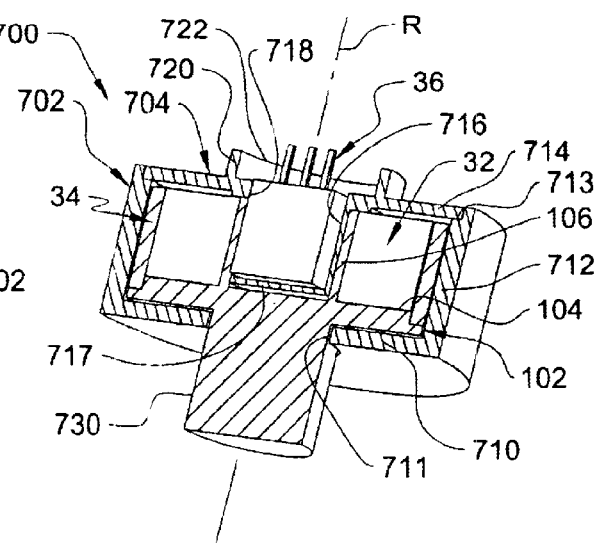
Fig. 19  Fig. 20
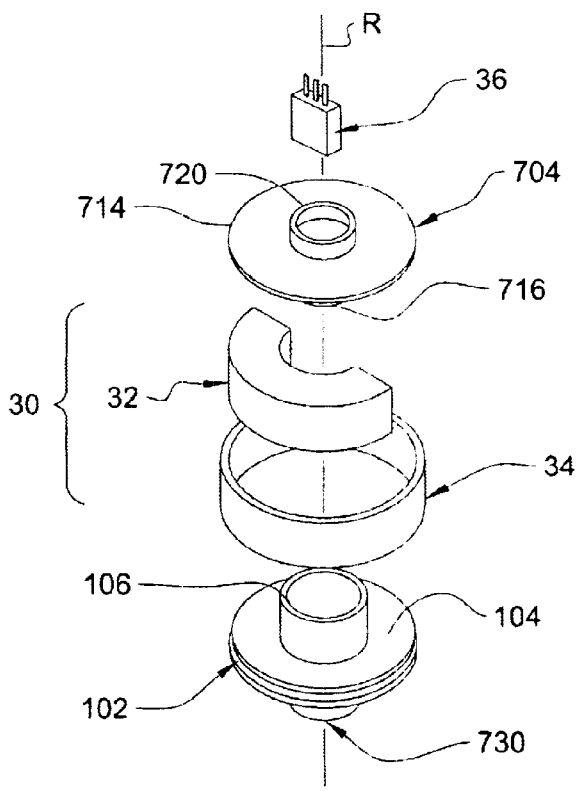
Fig. 21

MAGNETIC POSITION SENSOR

CROSS REFERENCE TO RELATED APPLICATIONS

The present application claims the benefit of U.S. Provisional Application Ser. No. 60/318,111 filed on Sep. 7, 2001, the contents of which are hereby incorporated by reference in their entirety.

FIELD OF THE INVENTION

The present invention generally relates to the field of magnetic position sensors, and more specifically relates to a non-contacting rotary magnetic position sensor for sensing rotational position of a structure over a predetermined range of rotation.

BACKGROUND OF THE INVENTION

Non-contacting position sensors are devices that generate change to an electronically interrogated physical parameter that is proportional to the movement of a structure, such as, for example, an actuator shaft operatively coupled to the sensor. This change is achieved without physical contact between the parameter and the interrogation device. In magnetic position sensing, the magnitude of magnetic field strength is generally measured by an appropriate measuring device, such as a Hall-effect element or magneto-resistive element. The value of the measured field intensity is translated through the measuring device to a voltage or current value that is uniquely representative of the specific rotational position of the actuator shaft.

Preferably, the magnetic field and voltage/current relationships have a substantially linear response. A linear response with minimum hysteresis is desired in almost all control algorithms that utilize sensor information. As virtually no magnetic material parameter has an exact linear relationship relative to position, it is often difficult to achieve a precise linear response from the sensing device relative to its position within the magnetic field. Additionally, magnetic hysteresis has the effect of causing an offset error signal to be generated whenever a magnetic element of the sensor (e.g., a magnetic pole piece or a magnetic rotor) is advanced from and returned to a predetermined reference position of the magnetic element. Annealing the magnetic element can minimize, but never totally eliminate, magnetic hysteresis.

For rotational magnetic position sensors, the actuator is typically a control shaft attached to some type of rotating object of interest. Normally, the shaft is attached directly to the sensor and rotation of the shaft correspondingly rotates the magnetic circuit of the sensor. Within the circuit's magnetic field, the sensing element is held in a fixed position, and the relative motion between the magnetic field and the sensing element generates a signal output that is directly proportional to the magnitude of the rotational movement.

To generate a magnetic field with a linear profile relative to the rotational movement, magnetic circuit designers often resort to complicated magnet shapes or field shaping pole pieces. Most circuit designs of these types suffer from performance or manufacturing limitations. Pole piece field shaping will generally suffer from hysteresis and assembly complexity. Complicated magnet shapes often lead to expensive magnet costs and package size limitations. Prior sensors also suffer from maximum physical and electrical rotation limitations. In some prior sensors, the control shaft passes through the center of the magnetic circuit. Many sensor applications can not utilize such a design due to the need to locate the working magnetic field within an area that is coaxial, with the axis of rotation of the control shaft.

Size and cost are always a priority in sensor design, particularly in the automotive and transportation industry. There are literally hundreds of applications for rotational position sensors in these industries. For these applications, a compact magnetic circuit design that can be applied to a wide variety of applications and physical configurations, as well as maintaining a degree of simplicity that will be reflected in a reduced sensor cost, is desired. Performance can not be compromised, and the ability to achieve the former with excellent linearity and hysteresis characteristics is highly desirable.

Thus, there is a general need in the industry to provide an improved magnetic position sensor. The present invention meets this need and provides other benefits and advantages in a novel and unobvious manner.

SUMMARY OF THE INVENTION

The present invention is directed to a magnetic position sensor. While the actual nature of the invention covered herein can only be determined with reference to the claims appended hereto, certain forms of the invention that are characteristic of the preferred embodiments disclosed herein are described briefly as follows.

In one form of the present invention, a magnetic position sensor is provided, comprising a magnet and a magnetic flux sensor. The magnet comprises a ring segment having a length. The magnet is polarized in a direction of magnetization extending generally along the length of the ring segment to generate a magnetic field. The magnetic flux sensor is disposed within the magnetic field and is operable to sense varying magnitudes of magnetic flux density during relative movement between the magnetic field and the magnetic flux sensor.

In another form of the present invention, a magnetic position sensor is provided, comprising an arc-shaped magnet and a magnetic flux sensor. The arc-shaped magnet defines an open inner region and is polarized in a direction of magnetization extending laterally across the open inner region to generate a magnetic field. The magnetic flux sensor is disposed within the magnetic field and is operable to sense varying magnitudes of magnetic flux density during relative movement between the magnetic field and the magnetic flux sensor.

In another form of the present invention, a magnetic position sensor is provided, comprising a magnet and a magnetic flux sensor. The magnet has a semi-annular ring configuration defining a diametric dimension and is polarized in a direction of magnetization extending generally along the diametric dimension to generate a magnetic field. The magnetic flux sensor is disposed within the magnetic field and is operable to sense varying magnitudes of magnetic flux density during relative rotational movement between the magnetic field and the magnetic flux sensor.

It is one object of the present invention to provide an improved magnetic position sensor.

It is another object of the present invention to provide an improved non-contacting rotary magnetic position sensor for sensing rotational position of a structure over a predetermined range of rotation.

Further objects, features, advantages, benefits, and aspects of the present invention will become apparent from the drawings and description contained herein.

BRIEF DESCRIPTION OF THE DRAWINGS

FIG. 19 is a perspective view of another embodiment of the sensor illustrated in FIG. 3.

FIG. 20 is a cross-sectional perspective view of the sensor illustrated in FIG. 19.

FIG. 21 is an exploded perspective view of the sensor illustrated in FIG. 19.

DESCRIPTION OF THE PREFERRED EMBODIMENTS

Figure 1:
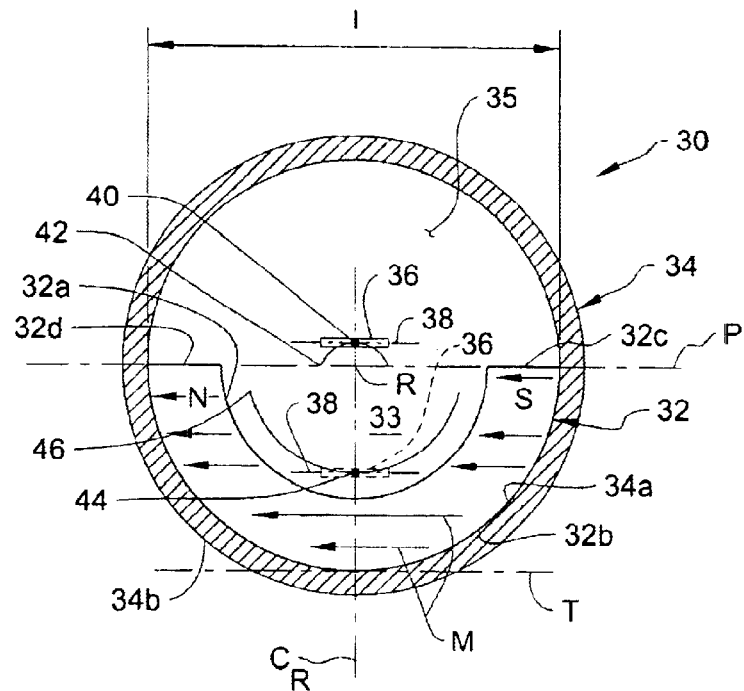
FIG. 1 is a schematic representation of a rotary magnetic circuit according to one form of the present invention.

For the purposes of promoting an understanding of the principles of the present invention, reference will now be made to the preferred embodiments illustrated in the drawings and specific language will be used to describe the same. It will nevertheless be understood that no limitation on the scope of the present invention is intended, with any alterations or modifications in the disclosed embodiments and further applications of the principles of the present invention being contemplated as would normally occur to one skilled in the art to which the present invention relates.

Referring to FIG. 1, shown therein is a schematic representation of a rotary magnetic circuit 30 according to one form of the present invention. Circuit 30 is generally comprised of a magnet 32 disposed within an air gap 35 defined by a pole piece or flux concentrating enclosure 34. As will be discussed in greater detail below, a sensing device 36 is provided to sense varying magnitudes of magnetic flux generated by the magnetic circuit 30.

In the illustrated embodiment of magnetic circuit 30, the magnet 32 preferably has a peripheral or arc-shaped configuration, and more preferably has a semi-annular ring configuration. The pole piece 34 preferably has an annular loop configuration. However, it should be understood that other shapes and configurations of magnet 32 and pole piece 34 are also contemplated as falling within the scope of the present invention. Additionally, for purposes of the present invention, a "pole piece" or "flux concentrating enclosure" is broadly defined as any magnetizable structure that defines an air gap, and preferably is a closed structure defining an enclosed air gap.

As discussed above, the magnet 32 has a semi-annular configuration comprising a 180° arc segment. This particular configuration of the magnet 32 increases sourcing opportunities and reduces the overall cost of magnetic circuit 30. However, it should be understood that magnet 32 may alternatively comprise an arc segment extending either greater than or less than 180° to correspond with the particular sensing range requirements of the magnetic circuit 30. Moreover, magnet 32 may take on other non-linear configurations, such as, for example, an elliptical configuration or other arcuate configurations. Additionally, magnet 32 may take on non-arcuate configurations, such as a rectangular configuration or other angular configurations.

Magnet 32 has an inwardly facing concave side surface 32a and an outwardly facing convex side surface 32b, each extending between a pair of end surfaces 32c and 32d. The concave side surface 32a and convex side surface 32b are preferably circumferential surfaces. The end surfaces 32c, 32d are preferably planar surfaces arranged along substantially parallel planes, and are more preferably arranged in a co-planar relationship extending along a common plane P. In the illustrated embodiment of the invention, the magnet 32 has a semi-annular configuration extending along a 180° arc segment, thereby positioning the plane P along a diameter of the semi-annular magnet 32 and intersecting the central axis of the semi-annular magnet 32. However, as discussed above, other shapes and configurations of the magnet 32 are also contemplated as falling within the scope of the present invention.

In one embodiment of the invention, the magnet 32 is polarized along its axial length l in a direction of magnetization M extending between a south pole S and a north pole N. The magnet 32 defines an open inner region 33, with the direction of magnetization M extending laterally across the open inner region 33. As illustrated in FIG. 1, the south and north poles S, N of the magnet 32 are preferably oriented along substantially parallel magnetic field lines extending uni-axially along the axial length l of the magnet 32 and across the open inner region 33. In embodiments of the invention utilizing a semi-annular magnet configuration, the direction of magnetization may be referred to as extending in a diametric direction along the diametric length of the magnet 32 (e.g., along the plane P). However, it should be understood that in alternative embodiments of the invention, the magnet 32 may be polarized in other directions. For example, the south pole S may alternatively be defined along the end surface 32c of the magnet 32 and the north pole N defined along the end surface 32d so as to polarize the magnet 32 in a circumferential direction along its arc length. It should also be understood that the magnet 32 may alternatively be polarized in a direction substantially opposite the direction of magnetization M by simply reversing the south and north poles S, N.

Figure 4:
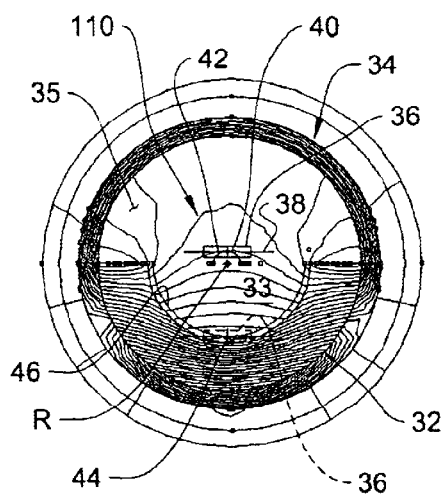
FIG. 4 is a diagrammatic view of the magnetic field associated with the magnetic circuit illustrated in FIG. 1.

In a preferred embodiment of the invention, the direction of magnetization M is arranged substantially parallel to a tangent line T drawn to the midpoint of the arc segment of magnet 32. Stated another way, the direction of magnetization M is arranged substantially normal to a central radial axis $C_R$ of the arc segment of magnet 32. As shown in FIG. 1, the direction of magnetization M is preferably arranged substantially parallel to the plane P extending between the end surfaces 32c, 32d of the magnet 32. As will be discussed in greater detail below, polarization of the magnet 32 in the direction of magnetization M generates an unbalanced magnetic field within the air gap 35 (FIG. 4).

In rotary sensor applications, the geometric dimensions of the magnet 32 are dictated by the size and configuration of the sensing device 36 and/or the material makeup of the magnet 32. A wide range of magnet materials can be used to balance size and cost considerations. In one embodiment, magnet 32 is a rare earth magnet and may be formed by injection molding. However, it should be understood that other forms and methods of manufacturing magnet 32 are also contemplated as falling within the scope of the present invention.

Pole piece 34 preferably has an annular configuration comprising a 360° closed loop. Although loop pole piece 34 has a cylindrical configuration, it should be understood that other shapes and configurations are contemplated, such as, for example, an elliptical configuration or other arcuate configurations. Additionally, pole piece 34 may take on non-arcuate configurations, such as a rectangular configuration or other angular configurations. Pole piece 34 has an inwardly facing circumferential surface 34a enclosing air gap area 35 and an outwardly facing circumferential surface 34b. The inner circumferential surface 34a has a contour that matches the contour of the outer circumferential surface 32b of magnet 32. Preferably, pole piece 34 is formed of soft magnetic steel; however, it should be understood that other suitable magnetically conductive materials are also contemplated. It should also be understood that although the magnetic circuit 30 is illustrated and described as including a pole piece 34 to provide a closed magnetic circuit and to shield the magnetic circuit from adjacent magnetic fields, other embodiments of the invention do not require the use of a pole piece 34.

The magnet 32 is disposed within air gap area 35 to form the magnetic circuit 30, with the outer circumferential surface 32b of magnet 32 placed in abutment against the inner circumferential surface 34a of pole piece 34. The magnet 32 is preferably adjoined to the pole piece 34 to prevent relative movement therebetween, which in turn eliminates or at least minimizes magnetic hysteresis. For purposes of the present invention, the term "adjoined" is broadly defined as a unitary fabrication, a permanent affixation, a detachable coupling, a continuous engagement or a contiguous disposal of a first structure relative to a second structure. Magnet 32 is preferably secured to pole piece 34 by a bonding agent, such as, for example, an adhesive, a plastic bond or by any other method of attachment that would occur to one of ordinary skill in the art.

The magnet 32 and the pole piece 34 cooperate to generate a magnetic field within air gap 35. As shown in FIG. 4, the magnetic circuit 30 generates a magnetic field 110 that is intentionally unbalanced. The unbalanced magnetic field 110 defines non-uniform flux line contours. The non-uniform flux line contours create a non-homogeneous magnetic field 110 within the air gap 35, which in turn varies the magnet flux density along the circumferential arc length of magnet 32. The pole piece 34 closes the magnetic circuit to enhance the magnetic field levels generated within air gap 35 by providing a return path for the magnetic flux generated by magnet 32. Pole piece 34 also serves to shield the circuit from magnetic fields existing outside of magnetic circuit 30 to prevent or at least minimize magnetic hysteresis.

The magnetic flux sensor 36 is disposed inside of air gap 35 and within the magnetic field 110 generated by magnetic circuit 30, and operates to sense variations in magnetic flux density during relative movement between the magnetic field 110 and the magnetic flux sensor 36. For purposes of the present invention, a "magnetic flux sensor" is broadly defined as any device that is operable to sense magnetic flux density and to generate at least one electrical signal representative of the magnitude of the magnetic flux density. Preferably, the magnetic flux sensor 36 is a Hall effect device that is capable of sensing magnetic flux density passing through a sensing plane 38. However, other magnetic flux sensors are also contemplated, such as, for example, a magneto-resistive sensor or any other magnetic field-sensitive sensor devices that would occur to one of ordinary skill in the art.

In one embodiment of the present invention, the relative movement between the magnetic field 110 and the magnetic flux sensor is relative rotational movement; however, it should be understood that such relative movement could alternatively by relative linear movement. Preferably, the magnetic field 110 is rotated about rotational axis R while the magnetic flux sensor 36 remains in a stationary position. However, it should be understood that the magnetic flux sensor 36 could alternatively be rotated about rotational axis R while the magnetic field 110 remains in a stationary position, or that the magnetic field 110 and the magnetic flux sensor 36 may both be rotated about a rotational axis R at, different rates and/or in different directions.

Referring to FIGS. 1 and 4, the magnetic flux sensor 36 may be positioned at a central location 40 within air gap 35, slightly offset from the rotational axis R and positioned at a predetermined distance from magnet 32. However, it should be understood that the magnetic sensor 36 could alternatively be positioned co-axial with the rotational axis R or at other locations adjacent the rotational axis R. When positioned at the central location 40, the magnetic flux sensor 36 will sense magnetic flux density along a sensing path 42 as the magnetic circuit 30 is rotated about rotational axis R. The sensing plane 38 of the magnetic flux sensor 36 continuously faces the inner circumferential surface 32a of magnet 32 during rotation of magnetic circuit 30 about the rotational axis R, and is preferably continuously oriented substantially parallel with a corresponding tangential line drawn to the inner circumferential surface 32a throughout such rotation. In this manner, the magnetic flux sensor 36 will sense magnetic field strength or flux density in directions normal to the inner circumferential surface 32a of magnet 32 as the magnetic circuit 30 is rotated about rotational axis R.

The magnetic flux sensor 36 in turn generates a voltage signal that is proportional to the magnitude of the sensed magnetic flux density. As will be discussed below, the generated voltage signal is substantially linear over at least 90 degrees of rotation, with less than +/−1% linear deviation from a best fit straight line and with minimal magnetic hysteresis. Based on the above discussion, it should be apparent that the radial (i.e., normal) magnetic field strength or flux density sensed by the magnetic flux sensor 36 is linearly proportional to the angular position of sensor 36 along sensing path 42. Although the illustrated embodiment of magnetic circuit 30 uses a single magnetic flux sensor 36, it should be understood that a plurality of magnetic flux sensors 36 may be positioned within magnetic field to generate multiple signal outputs for applications requiring redundant signal outputs or multiple signal output profiles.

In another embodiment of the present invention, the magnetic flux sensor 36 may be positioned at a location 44 within air gap 35, proximately adjacent the inner circumferential surface 32a of magnet 32 and spaced a predetermined distance therefrom. When positioned at location 44, the magnetic flux sensor 36 will sense magnetic flux density along a sensing path 46 as the magnetic circuit 30 is rotated about rotational axis R. The sensing path 46 is arranged substantially parallel with the inner circumferential surface 32a of magnet 32, with a constant distance being maintained therebetween during rotation of the magnetic circuit 30. Once again, the sensing plane 38 of the magnetic flux sensor 36 continuously faces the inner circumferential surface 32a during rotation of magnetic circuit 30 about rotational axis R, and is preferably continuously oriented substantially parallel with a corresponding tangential line drawn to the inner circumferential surface 32a throughout such rotation. In this manner, the magnetic flux sensor 36 will sense magnetic field strength or flux density in directions normal to the inner circumferential surface 32a of magnet 32 as the magnetic circuit 30 is rotated about rotational axis R. The magnetic flux sensor 36 will in turn generate a voltage signal that is directly proportional to the magnitude of the magnetic flux density along sensing path 46.

Figure 7:
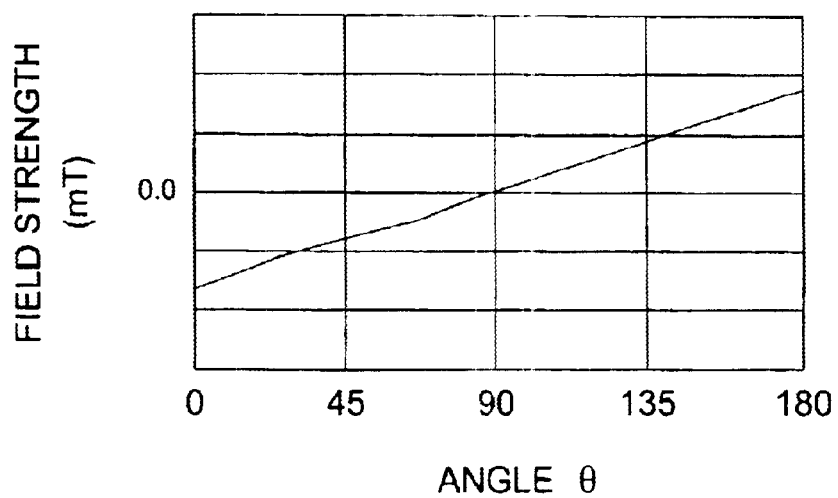
FIG. 7 is a graph depicting measured magnetic field strength along a first sensing path as a function of the angular rotation position of the magnetic circuit illustrated in FIG. 1.
Figure 8:
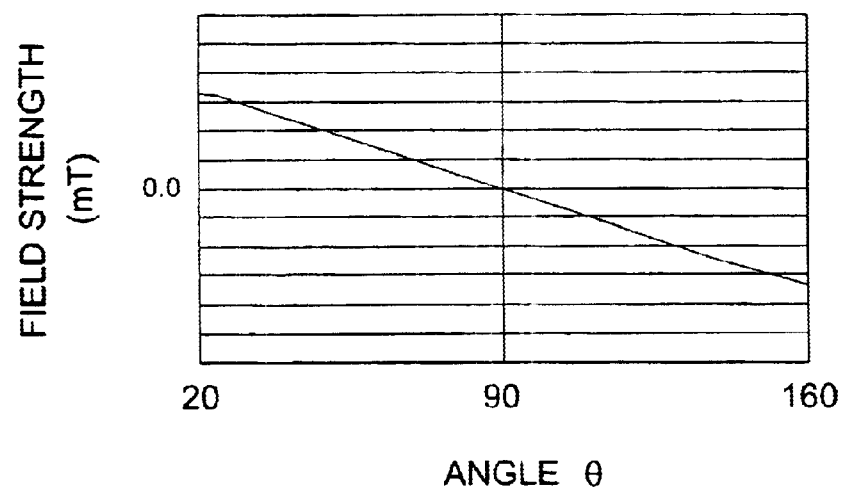
FIG. 8 is a graph depicting measured magnetic field strength along a second sensing path as a function of the angular rotation position of the magnetic circuit illustrated in FIG. 1.

Referring to FIGS. 7 and 8, shown therein are graphs depicting the magnetic field strength sensed by the magnetic flux sensor 36 along sensing paths 42 and 46, respectively, as a function of the angular rotational position θ of the magnetic circuit 30. In each instance, the 90° angular rotational position corresponds to the relative sensor locations illustrated in FIGS. 1 and 4 (i.e., a location facing the midpoint of the magnet).

In the 90° angular rotational position, the normal magnetic field strength will be at or near zero, with virtually no magnetic flux passing through the sensing plane 38 of magnetic flux sensor 36. However, as the magnetic field 10 is rotated about rotational axis R in either direction, the sensed magnitude of magnetic field strength or flux density correspondingly increases or decreases in a linear fashion as an increasing quantity/density of magnetic flux passes through the sensing plane 38 of magnetic flux sensor 36. Consequently, each degree of movement in the angular rotational position θ of magnetic circuit 30 results in a corresponding linear variation in the magnitude of magnetic flux density passing through the sensing plane 38 of magnetic flux sensor 36. It should therefore be appreciated that the output signal generated by magnetic flux sensor 36 will linearly vary with each degree of rotational movement θ of magnetic circuit 30 about rotational axis R.

As shown in FIG. 7, the magnetic field strength along sensing path 42 is substantially linear throughout a full 180° of rotational movement (i.e., θ=0° to 180°), preferably exhibiting less than +/−1% deviation from a perfectly straight line. As shown in FIG. 8, the magnetic field strength along sensing path 46 is substantially linear throughout a 140° of rotational movement (i.e., θ=20° to 160°). It should be understood that the ranges of rotational movement are examples of specific embodiments of the present invention, and that other ranges of rotational movement are also contemplated as falling within the scope of the present invention. Additionally, although the sensing paths 42, 46 are limited to approximately 180°, it should also be understood that the magnetic sensor is physically capable of being rotated a full 360°.

Figure 2:
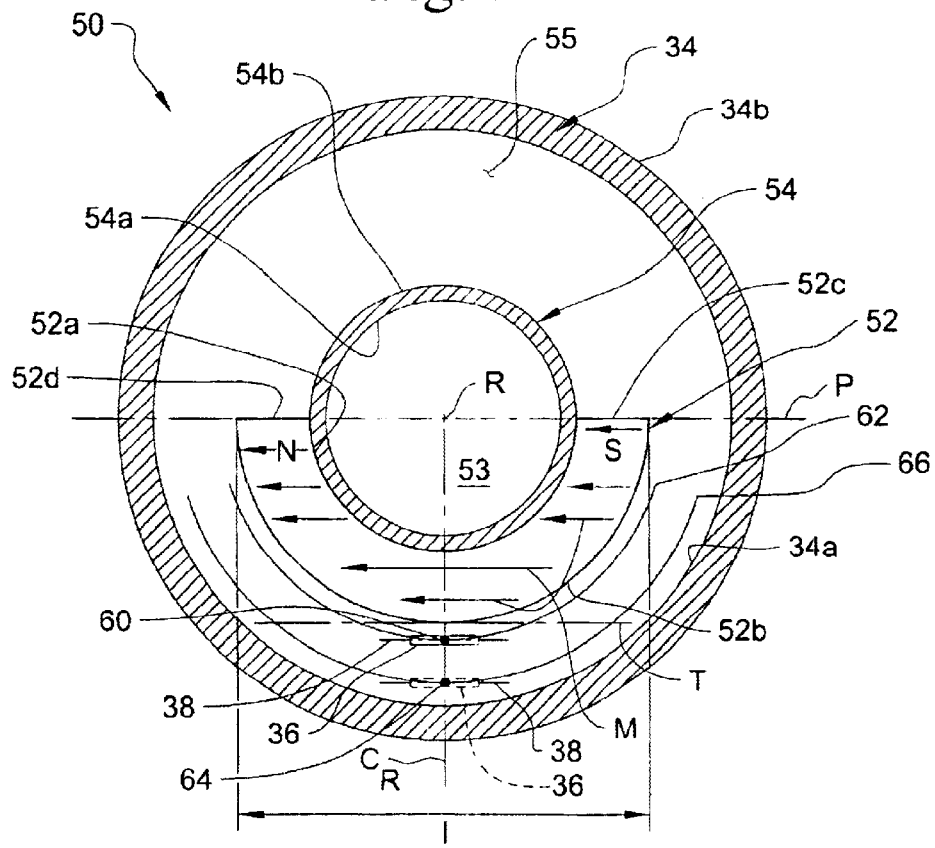
FIG. 2 is a schematic representation of a rotary magnetic circuit according to another form of the present invention.

Referring now to FIG. 2, shown therein is a schematic representation of a rotary magnetic circuit 50 according to another form of the present invention. Circuit 50 is generally comprised of a magnet 52 disposed within an air gap 55 defined between an outer pole piece 34 and an inner pole piece 54. A sensing device 36 is provided to sense the magnetic flux generated by the magnetic circuit 50. The pole piece 34 and the sensing element 36 are virtually identical to those discussed above with regard to magnetic circuit 30. However, as indicated above, other types and configurations of pole piece 34 and sensing element 36 are also contemplated.

In the illustrated embodiment of circuit 50, magnet 52 is configured similar to magnet 32 having a semi-annular configuration comprising a 180° arc segment. However, it should be understood that magnet 52 may take on alternative shapes and configurations such as, for example, those discussed above with regard to magnet 32. Magnet 52 has an inwardly facing concave side surface 52a and an outwardly facing convex side surface 52b, each extending between end surfaces 52c and 52d. Preferably, concave side surface 52a and convex side surface 52b are circumferential surfaces. The end surfaces 52c, 52d are preferably planar surfaces arranged along substantially parallel planes, and are more preferably arranged in a co-planar relationship extending along a common plane P. In the illustrated embodiment of the invention, the magnet 52 has a semi-annular configuration extending along a 180° arc segment, thereby positioning the plane P along a diameter of the semi-annular magnet 52 and intersecting the central axis of the semi-annular magnet 52.

Figure 10:
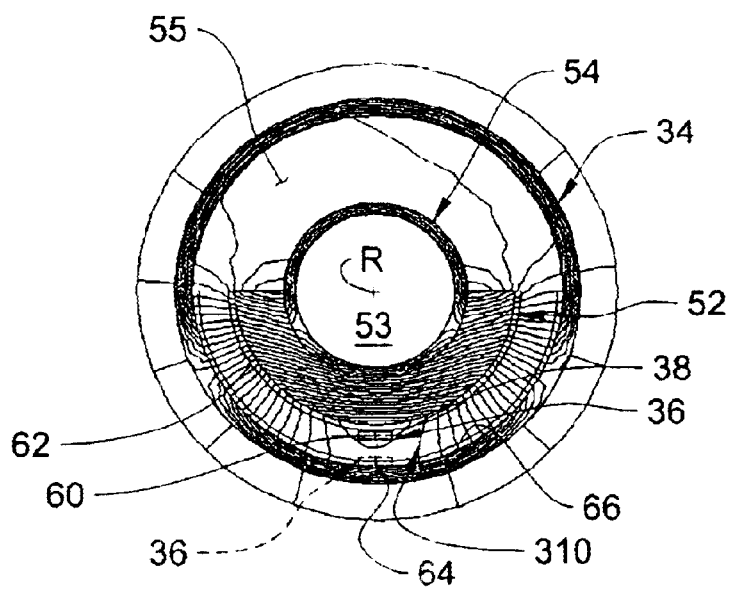
FIG. 10 is a diagrammatic view of the magnetic field associated with the sensor illustrated in FIG. 9.

As discussed above with regard to magnet 32, the magnet 52 is polarized along its axial length l in a direction of magnetization M extending between a south pole S and a north pole N. The magnet 52 defines an open inner region 53, with the direction of magnetization M extending laterally across the open inner region 53. As illustrated in FIG. 1, the south and north poles S, N of the magnet 32 are preferably oriented along substantially parallel magnetic field lines. As illustrated in FIG. 2, the south and north poles S, N of the magnet 52 are preferably oriented along substantially parallel magnetic field lines extending uni-axially along the axial length l of the magnet 52 and across the open inner region 53. However, it should be understood that in alternative embodiments of the invention, magnet 52 may be polarized in other directions such as, for example, the alternative polarization directions described above with regard to magnet 32. In a preferred embodiment of the invention, the direction of magnetization M is arranged substantially parallel to a tangent line T drawn to the midpoint of the arc segment of magnet 52. Stated another way, the direction of magnetization M is arranged substantially normal to a central radial axis $C_R$ of the arc segment of magnet 52. The direction of magnetization M is preferably arranged substantially parallel to the plane P extending between the end surfaces 52c, 52d of the magnet 52. As will be discussed in greater detail below, polarization of the magnet 52 in the direction of magnetization M generates an unbalanced magnetic field within the air gap 55 (FIG. 10).

The inner pole piece 54 of sensor 50 preferably has an annular loop configuration comprising a 360° closed loop. Although the inner loop pole piece 54 has a cylindrical configuration, it should be understood that other shapes and configurations are contemplated such as, for example, those alternative shapes and configurations discussed above with regard to pole piece 34. The inner pole piece 54 has an inwardly facing circumferential surface 54a and an outwardly facing circumferential surface 54b. The outer circumferential surface 54b has a contour that matches the contour of the inner circumferential surface 52a of magnet 52. Preferably, the inner pole piece 54 is formed of soft magnetic steel; however, it should be understood that other suitable magnetically conductive materials are also contemplated. It should also be understood that although the magnetic circuit 50 is illustrated and described as including inner and outer pole pieces 54, 34, other embodiments of the invention do not require the use of one or both of the inner and outer pole pieces 54, 34.

The magnet 52 is disposed within the air gap area 55 defined between the inner and outer pole pieces 54, 34 to form the magnetic circuit 50, with the inner surface 52b of magnet 52 placed in abutment against the outer surface 54a of inner pole piece 54. The magnet 52 is preferably adjoined to the inner pole piece 54 to prevent relative movement therebetween, which in turn eliminates or at least minimizes magnetic hysteresis. Magnet 52 is preferably secured to inner pole piece 54 by a bonding agent, such as, for example, an adhesive, a plastic bond or by any other method of attachment that would occur to one of ordinary skill in the art.

The magnet 52 and the inner and outer pole pieces 54, 34 cooperate to generate a magnetic field within air gap 55. As shown in FIG. 10, the magnetic circuit 50 generates a magnetic field 310 that is intentionally unbalanced. The unbalanced magnetic field defines non-uniform flux line contours. The non-uniform flux line contours create a non-homogeneous magnetic field 310 within the air gap 55, which in turn varies the magnet flux density along the circumferential arc length of magnet 52. The inner and outer pole pieces 54, 34 close the magnetic circuit to enhance the magnetic field levels generated within air gap 55 by providing a return path for the flux generated by magnet 52. Pole piece 54, 34 also serve to shield the circuit from magnetic fields existing outside of magnetic circuit 50 to prevent or at least minimize magnetic hysteresis.

The magnetic flux sensor 36 is disposed inside of air gap 55 and within the magnetic field 310 generated by magnetic circuit 50, and operates to sense variations in magnetic flux density during relative movement between the magnetic field 310 the magnetic flux sensor 36. In one embodiment of the invention, the magnetic field 310 is rotated about rotational axis R while the magnetic flux sensor 36 remains in a stationary position.

Referring to FIGS. 2 and 10, the magnetic flux sensor 36 may be positioned at a location 60 within air gap 55, proximately adjacent the outer circumferential surface 52b of magnet 52 and spaced a predetermined distance therefrom. When positioned at location 60, the magnetic flux sensor 36 will sense magnetic flux density along a sensing path 62 as the magnetic circuit 50 is rotated about rotational axis R. The sensing path 62 is oriented substantially parallel with the outer circumferential surface 52b of magnet 52, with a constant distance maintained therebetween. The sensing plane 38 of the magnetic flux sensor 36 continuously faces the outer circumferential surface 52b during rotation of magnetic circuit 50 about rotational axis R, and is preferably continuously oriented substantially parallel with a corresponding tangential line drawn to the outer circumferential surface 52b throughout such rotation. In this manner, the magnetic flux sensor 36 will sense magnetic field strength or flux density in directions normal to the outer circumferential surface 52b of magnet 52 as the magnetic circuit 50 is rotated about rotational axis R. The magnetic flux sensor 36 generates a voltage signal that is directly proportional to the magnitude of the sensed magnetic flux density, which in turn is linearly proportional to the angular position of sensor 36 along sensing path 62. Although the illustrated embodiment of magnetic circuit 50 uses a single magnetic flux sensor 36, it should be understood that a plurality of magnetic flux sensors 36 may be positioned within magnetic field 310 to generate multiple signal outputs.

In an alternative embodiment of magnetic circuit 50, the magnetic flux sensor 36 may be positioned at a location 64 within air gap 55, proximately adjacent the inner circumferential surface 34a of outer pole piece 34 and spaced a predetermined distance therefrom. When positioned at location 64, the magnetic flux sensor 36 will sense magnetic flux density along a sensing path 66 as the magnetic circuit 50 is rotated about rotational axis R. The sensing path 66 is oriented substantially parallel with the outer circumferential surface 52b of magnet 52, with a constant distance maintained therebetween. The sensing plane 38 of the magnetic flux sensor 36 continuously faces the outer circumferential surface 52b during rotation of magnetic circuit 50 about rotational axis R, and is preferably continuously oriented substantially parallel with a corresponding tangential line drawn to the outer circumferential surface 52b throughout such rotation.

Figure 11:
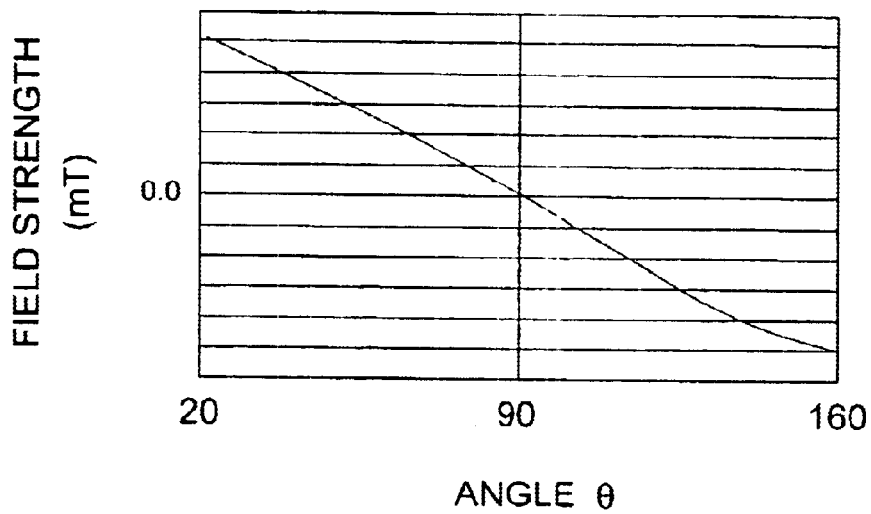
FIG. 11 is a graph depicting measured magnetic field strength along a first sensing path as a function of the angular rotation position of the magnetic circuit illustrated in FIG. 2.
Figure 12:
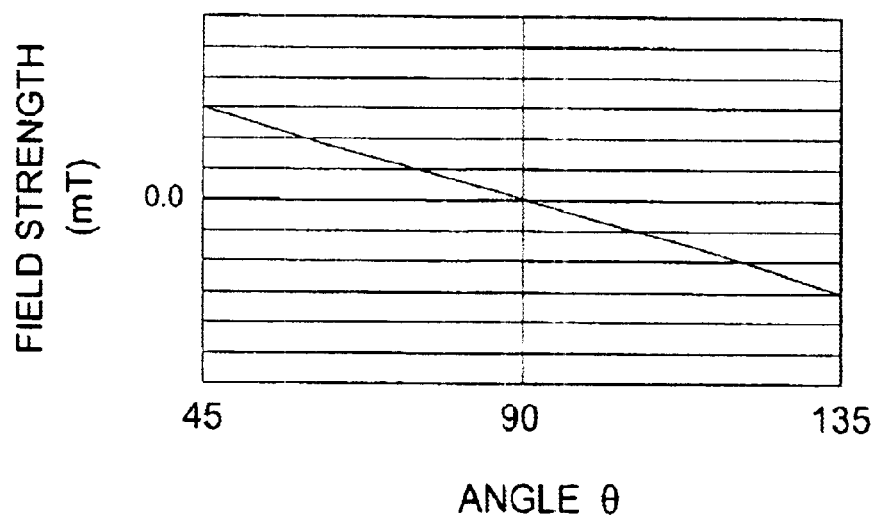
FIG. 12 is a graph depicting measured magnetic field strength along a second sensing path as a function of the angular rotation position of the magnetic circuit illustrated in FIG. 2.

Referring to FIGS. 11 and 12, shown therein are graphs depicting the magnetic field strength sensed by the magnetic flux sensor 36 along sensing paths 62 and 66, respectively, as a function of the angular rotational position θ of the magnetic circuit 50. In each instance, the 90° angular rotational position corresponds to the relative sensor locations illustrated in FIGS. 2 and 10. In the 90° angular rotational position, the normal magnetic field strength will be at or near zero, with virtually no magnetic flux passing through the sensing plane 38 of magnetic flux sensor 36. However, as the magnetic field 310 is rotated about rotational axis R in either direction, the sensed magnitude of magnetic field strength or flux density correspondingly increases or decreases in a linear fashion as an increasing quantity/density of magnetic flux passes through the sensing plane 38 of magnetic flux sensor 36. Consequently, each degree of movement in the angular rotational position θ of magnetic circuit 50 results in a corresponding linear variation in the magnitude of magnetic flux density passing through the sensing plane 38 of magnetic flux sensor 36. It should therefore be appreciated that the output signal generated by magnetic flux sensor 36 will linearly vary with each degree of rotational movement θ of magnetic circuit 50 about rotational axis R.

As shown in FIG. 11, the magnetic field strength along sensing path 62 is substantially linear throughout a full 140° of rotational movement (i.e., θ=20° to 160°). As shown in FIG. 8, the magnetic field strength along sensing path 66 is substantially linear throughout a 90° of rotational movement (i.e., θ=45° to 135°). It should be understood that the ranges of rotational movement are examples of specific embodiments of the present invention, and that other ranges of rotational movement are also contemplated as falling within the scope of the present invention. Additionally, although the sensing paths 62, 66 are limited to approximately 180°, it should also be understood that the magnetic sensor is physically capable of being rotated a full 360°.

Figure 3:
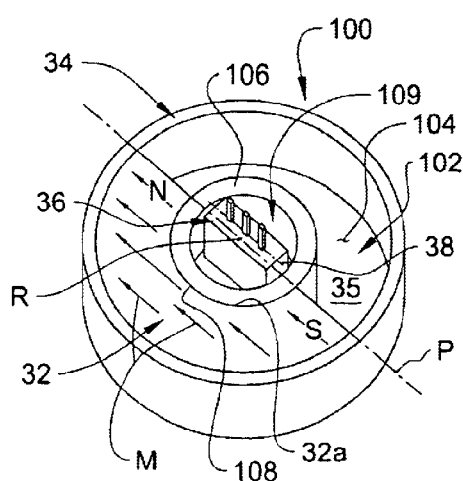
FIG. 3 is a perspective view of one embodiment of a rotary magnetic sensor utilizing the magnetic circuit illustrated in FIG. 1.

Referring to FIG. 3, shown therein is a rotary magnetic sensor 100 according to another embodiment of the present invention. The sensor 100 utilizes a magnetic circuit similar to the magnetic circuit 30 illustrated in FIG. 1. However, in addition to magnet 32, pole piece 34 and magnetic flux sensor 36, the sensor 100 includes a central rotor 102. Rotor 102 is preferably formed of a non-magnetically conductive material, such as, for example, a plastic material, a polymer or a composite material. Rotor 102 has an annular base portion 104 and a cylindrical flange portion 106 extending therefrom. Flange portion 106 includes an outer circumferential surface 108 that preferably abuts the inner circumferential surface 32a of magnet 32. Flange portion 106 also defines an inner cavity 109 for receiving the magnetic flux sensor 36 therein. The magnet 32 and the pole piece 34 are adjoined to rotor 102 such that rotational movement of rotor 102 correspondingly rotates magnet 32 and pole piece 34 about the rotational axis R, while the magnetic flux sensor 36 preferably remains in a stationary position.

Figure 5:
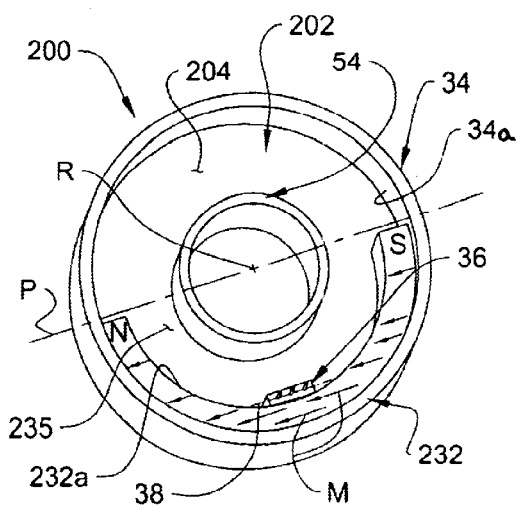
FIG. 5 is a perspective view of another embodiment of a rotary magnetic sensor utilizing a variation of the magnetic circuit illustrated in FIG. 1.
Figure 6:
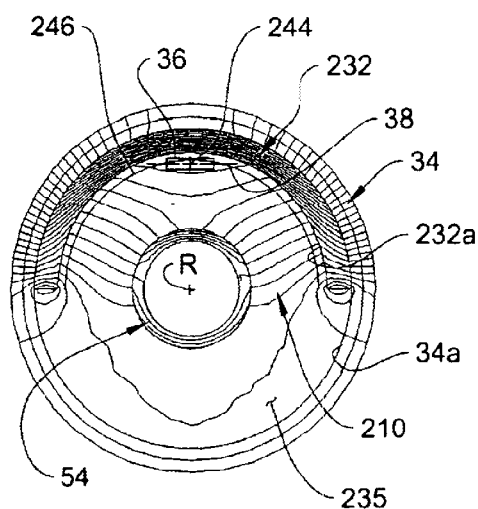
FIG. 6 is a diagrammatic view of the magnetic field associated with the sensor illustrated in FIG. 5.

Referring to FIGS. 5 and 6, shown therein is a rotary magnetic sensor 200 according to another embodiment of the present invention. The sensor 200 utilizes a magnetic circuit similar to the magnetic circuit 30 illustrated in FIG. 1. The sensor 200 includes a magnet 232 configured similar to the magnet 32 with the exception of having a reduced radial thickness. Additionally, sensor 200 includes an inner pole piece 54, an outer pole piece 34, a magnetic flux sensor 36 and a rotor 202. Rotor 202 has an annular base portion 204 formed of a non-magnetically conductive material, such as, for example, a plastic material, a polymer or a composite material. As shown in FIG. 6, magnet 232, outer pole piece 34 and inner pole piece 54 cooperate to form a magnetic circuit that generates a magnetic field 210 within air gap 235. The magnetic field 210 is intentionally unbalanced, defining non-uniform flux line contours that create a non-homogeneous magnetic field within the air gap 235, which in turn creates substantially linear variation in the magnitude of magnet flux density along the circumferential arc length of magnet 232.

The magnet 232, the inner pole piece 54 and outer pole piece 34 are adjoined to rotor 202 such that rotational movement of rotor 202 correspondingly rotates the magnetic filed 210 about rotational axis R, while magnetic flux sensor 36 preferably remains in a stationary position. The magnetic flux sensor 36 is positioned at a location 244 within air gap 235 between inner pole piece 54 and magnet 232, proximately adjacent the inner circumferential surface 232a of magnet 232 and spaced a predetermined distance therefrom. When positioned at location 244, the magnetic flux sensor 36 will sense magnetic flux density along a sensing path 246 as the magnetic field 210 is rotated about rotational axis R. The sensing path 246 is oriented substantially parallel with the inner circumferential surface 232a of magnet 232 with a constant distance maintained therebetween. The sensing plane 38 of the magnetic flux sensor 36 continuously faces the inner circumferential surface 232a of magnet 232 during rotation of magnetic field 210 about rotational axis R, and is preferably continuously oriented substantially parallel with a corresponding tangential line drawn to the inner circumferential surface 232a throughout such rotation.

Figure 9:
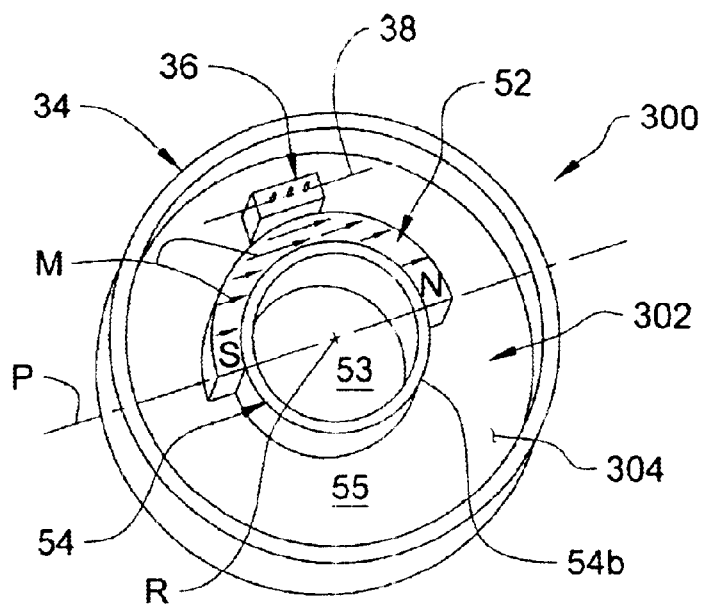
FIG. 9 is a perspective view of one embodiment of a rotary magnetic sensor utilizing the magnetic circuit illustrated in FIG. 2.

Referring to FIG. 9, shown therein is a rotary magnetic sensor 300 according to another embodiment of the present invention. The sensor 300 utilizes a magnetic circuit similar to the magnetic circuit 50 illustrated in FIG. 2. However, in addition to magnet 52, outer pole piece 34, inner pole piece 54 and magnetic flux sensor 36, sensor 300 includes a rotor 302. Rotor 302 has an annular base portion 304 that is preferably formed of a non-magnetically conductive material, such as, for example, a plastic material, a polymer or a composite material. The magnet 52, the outer pole piece 34 and the inner pole piece 54 are adjoined to rotor 302 such that rotational movement of rotor 302 correspondingly rotates the magnetic circuit 50 about rotational axis R, while magnetic flux sensor 36 preferably remains in a stationary position.

Figure 13:
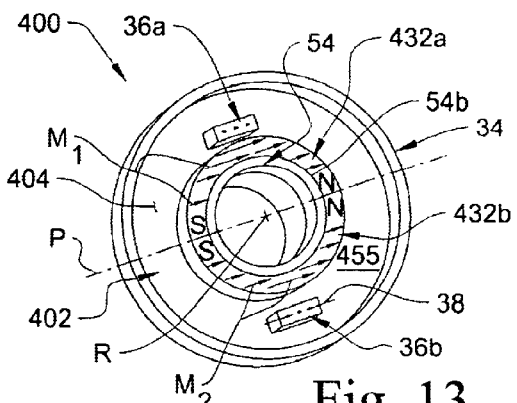
FIG. 13 is a perspective view of a rotary magnetic position sensor according to another form of the present invention.
Figure 14:
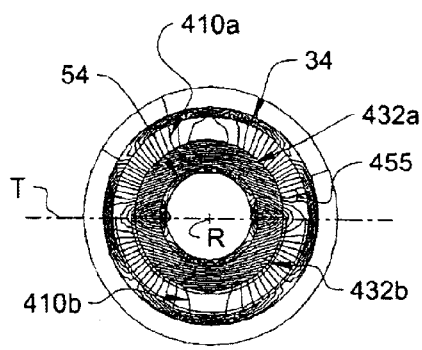
FIG. 14 is a diagrammatic view of the magnetic field associated with the sensor illustrated in FIG. 13.

Referring to FIGS. 13 and 14, shown therein is a rotary magnetic sensor 400 according to another embodiment of the present invention. Sensor 400 is configured similar to sensor 300 illustrated in FIG. 9, including an inner pole piece 54 disposed within an outer pole piece 34 to define an air gap 455 therebetween. However, sensor 400 includes a pair of oppositely disposed magnets 432a, 432b and a pair of oppositely disposed magnetic flux sensors 36a, 36b disposed within air gap 455. Each of the magnets 432a, 432b are configured similar to the magnet 52, and are similarly adjoined to the outer circumferential surface 54b of inner pole piece 54. Magnets 432a, 432b are arranged such that their north and south poles N, S are respectively positioned adjacent one another, with the directions of magnetization $M_1$, $M_2$ of the magnets 432a, 432b extending in the same general direction.

As shown in FIG. 14, magnets 432a, 432b, outer pole piece 34 and inner pole piece 54 cooperate to form a magnetic circuit that generates magnetic fields 410a, 410b within air gap 455. The magnetic fields 410a, 410b are generally symmetrical to one another relative to a transverse axis T which is preferably arranged to intersect the rotational axis R. The magnetic fields 410a, 410b are intentionally unbalanced, each defining non-uniform flux line contours that create a non-homogeneous magnetic field within the air gap 455 which in turn creates variation in the magnitude of magnet flux density along the circumferential arc lengths of magnets 432a, 432b. The magnetic flux sensors 36a, 36b are positioned within the magnetic fields 410a, 410b, respectively.

Sensor 400 also includes a rotor 402 having an annular base portion 404 that is preferably formed of a non-magnetically conductive material, such as, for example, a plastic material, a polymer or a composite material. The magnets 432a, 432b, the outer pole piece 34 and the inner pole piece 54 are adjoined to rotor 402 such that rotational movement of rotor 402 correspondingly rotates the magnetic fields 410a, 410b about rotational axis R, while magnetic flux sensors 36a, 36b preferably remain in a stationary position. The magnetic flux sensors 36a, 36b are positioned within air gap 455 between the outer circumferential surfaces of magnets 432a, 432b and the inner circumferential surface 34a of outer pole piece 34. The magnetic flux sensors 36a, 36b each sense varying magnitudes of magnetic flux density along a sensing path as the magnetic fields 410a, 410b are rotated about rotational axis R. As should be appreciated, the magnetic flux sensors 36a, 36b generate redundant voltage output signals as the magnetic fields 410a, 410b are rotated about rotational axis R. As should also be appreciated, the magnetic flux sensors 36a, 36b may alternatively be configured to generate inverse voltage output signals as the magnetic fields 410a, 410b are rotated about rotational axis R.

Figure 15:
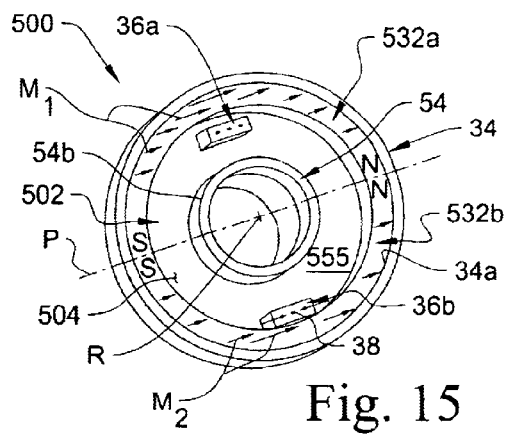
FIG. 15 is a perspective view of a rotary magnetic position sensor according to yet another form of the present invention.
Figure 16:
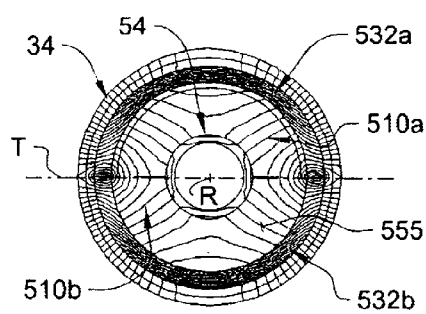
FIG. 16 is a diagrammatic view of the magnetic field associated with the sensor illustrated in FIG. 15.

Referring to FIGS. 15 and 16, shown therein is a rotary magnetic sensor 500 according to another embodiment of the present invention. Sensor 500 is configured similar to sensor 200 illustrated in FIG. 5, including an inner pole piece 54 disposed within an outer pole piece 34 to define an air gap 555 therebetween. However, sensor 500 includes a pair of oppositely disposed magnets 532a, 532b and a pair of oppositely disposed magnetic flux sensors 36a, 36b disposed within air gap 555. Each of the magnets 532a, 532b are configured similar to magnet 232 and are similarly adjoined to the inner circumferential surface 34a of outer pole piece 34. Magnets 532a, 532b are arranged such that their north and south poles N, S are respectively positioned adjacent one another, with the directions of magnetization $M_1$, $M_2$ of the magnets 532a, 532b extending in the same general direction.

As shown in FIG. 16, magnets 532a, 532b, outer pole piece 34 and inner pole piece 54 cooperate to form a magnetic circuit that generates magnetic fields 510a, 510b within air gap 555. The magnetic fields 510a, 510b are generally symmetrical to one another relative to a transverse axis T which is preferably arranged to intersect the rotational axis R. The magnetic fields 510a, 510b are intentionally unbalanced, each defining non-uniform flux line contours that create a non-homogeneous magnetic field within the air gap 555 which in turn creates variation in the magnitude of magnet flux density along the circumferential arc lengths of magnets 532a, 532b. The magnetic flux sensors 36a, 36b are disposed within the magnetic fields 510a, 510b, respectively.

Sensor 500 also includes a rotor 502 having an annular base portion 504 that is preferably formed of a non-magnetically conductive material, such as, for example, a plastic material, a polymer or a composite material. The magnets 532a, 532b, the outer pole piece 34 and the inner pole piece 54 are adjoined to rotor 502 such that rotational movement of rotor 502 correspondingly rotates the magnetic fields 510a, 510b about rotational axis R, while magnetic flux sensors 36a, 36b preferably remain in a stationary position. The magnetic flux sensors 36a, 36b are positioned within air gap 555 between the inner circumferential surfaces of magnets 532a, 532b and the outer circumferential surface 54b of inner pole piece 54. The magnetic flux sensors 36a, 36b each sense varying magnitudes of magnetic flux density along a sensing path as the magnetic fields 510a, 510b are rotated about rotational axis R. As should be appreciated, the magnetic flux sensors 36a, 36b will generate redundant voltage output signals as the magnetic fields 510a, 510b are rotated about rotational axis R. As should also be appreciated, the magnetic flux sensors 36a, 36b may alternatively be configured to generate inverse voltage output signals as the magnetic fields 510a, 510b are rotated about rotational axis R.

Figure 17:
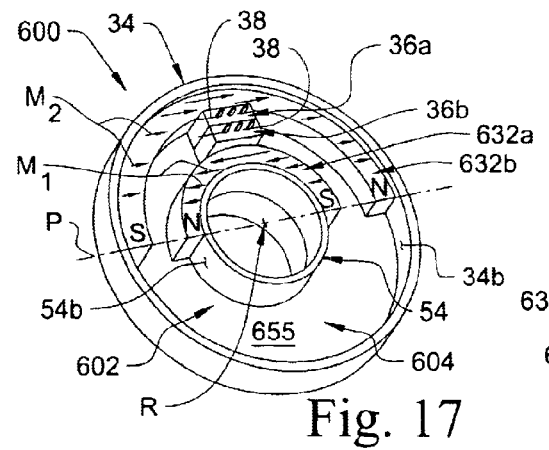
FIG. 17 is a perspective view of a rotary magnetic position sensor according to still another form of the present invention.
Figure 18:
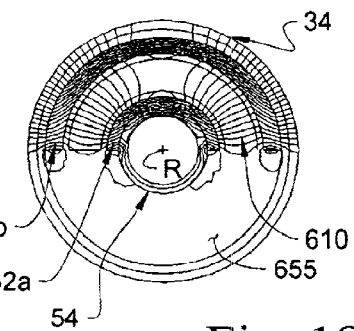
FIG. 18 is a diagrammatic view of the magnetic field associated with the sensor illustrated in FIG. 17.

Referring to FIGS. 17 and 18, shown therein is a rotary magnetic sensor 600 according to another embodiment of the present invention. Sensor 600 includes an inner pole piece 54 disposed within an outer pole piece 34 to define an air gap 655 therebetween. Sensor 600 also includes an inner magnet 632a having an inner circumferential surface abutting the outer circumferential surface 54b of inner pole piece 54, an outer magnet 632b having an outer circumferential surface abutting the inner circumferential surface 34a of outer pole piece 34, and a pair of magnetic flux sensors 36a, 36b disposed adjacent one another within air gap 655. The inner magnet 632a is configured similar to magnet 52 of sensor 300, while the outer magnet 632b is configured similar to magnet 232 of sensor 200. Magnets 632a, 632b are arranged such that the north pole N of magnet 632a is positioned adjacent the south pole S of magnet 632b, with the directions of magnetization $M_1$, $M_2$ of the magnets 632a, 632b extending in generally opposite directions.

As shown in FIG. 18, magnets 632a, 632b, outer pole piece 34 and inner pole piece 54 cooperate to form a magnetic circuit that generates a magnetic field 610 within air gap 655. The magnetic field 610 is intentionally unbalanced so as to define non-uniform flux line contours that create a non-homogeneous magnetic field within the air gap 655 which in turn creates variation in the magnitude of magnet flux density along the circumferential arc lengths of magnets 632a, 632b.

Sensor 600 also includes a rotor 602 having an annular base portion 604 that is preferably formed of a non-magnetically conductive material, such as, for example, a plastic material, a polymer or a composite material. The magnets 632a, 632b, the outer pole piece 34 and the inner pole piece 54 are adjoined to rotor 602 such that rotational movement of rotor 602 correspondingly rotates the magnetic field 610 about rotational axis R, while magnetic flux sensors 36a, 36b preferably remain in a stationary position. The magnetic flux sensors 36a, 36b are positioned within air gap 655 between the outer circumferential surface of inner magnet 632a and the inner circumferential surface of outer magnet 632b. The magnetic flux sensors 36a, 36b each sense varying magnitudes of magnetic flux density along a sensing path as the magnetic field 610 is rotated about rotational axis R. As should be appreciated, the magnetic flux sensors 36a, 36b will generate redundant voltage output signals as the magnetic field 610 is rotated about rotational axis R. As should also be appreciated, the magnetic flux sensors 36a, 36b may alternatively be configured to generate inverse voltage output signals as the magnetic field 610 is rotated about rotational axis R.

Referring to FIGS. 19–21, shown therein is a rotary magnetic sensor 700 according to another embodiment of the present invention. Sensor 700 is configured similar to sensor 100 illustrated in FIG. 3, and is generally comprised of semi-annular magnet 32, loop pole piece 34, magnetic flux sensor 36, rotor 102, an outer housing 702 and an end cap 704. The housing 702 and the end cap 704 are preferably formed of a non-magnetically conductive material, such as, for example, a plastic material, a polymer or a composite material. Housing 702 and end cap 704 serve to encapsulate the inner components of the magnetic circuit 30 to provide protection from the outer environment and to shield the magnetic circuit 30 from magnetic fields existing outside of sensor 700 to eliminate or at least minimize magnetic hysteresis.

Housing 702 includes a circular base portion 710 defining a central opening 711 extending therethrough, and a cylindrical flange portion 712 defining an open end 713. The cylindrical flange portion 712 is sized to receive the loop pole piece 34 and the rotor 102 therein. A control shaft 730 is adjoined to the circular base portion 710 of rotor 102 and extends through the central opening 711. Control shaft 730 is preferably adjoined to rotor 102 such that each degree of rotational movement of control shaft 730 correspondingly rotates rotor 102 and the magnetic field 110 about rotational axis R. Although control shaft 730 is preferably configured to rotate about rotational axis R, it should be understood that control shaft 730 may alternatively rotate about an axis that does not coincide with rotational axis R.

The end cap 704 includes a circular base portion 714, a cylindrical portion 716 having a closed end 717 and an open end 718, and a cylindrical flange portion 720 extending outwardly from base portion 714 and defining an open end 722. The circular base portion 714 is sized to close off the open end 713 of housing 702. The cylindrical portion 716 is sized to receive the magnetic flux sensor 36 therein while maintaining a sufficient tolerance to allow for relative rotational movement about rotational axis R.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A magnetic position sensor, comprising:
   a magnet comprising a ring segment having a length and a curved surface, said magnet being polarized in a uniaxial direction of magnetization extending generally along said length to generate a magnetic field; and
   a magnetic flux sensor disposed within said magnetic field and operable to sense varying magnitudes of magnetic flux density in directions substantially normal to said curved surface of said magnet during relative rotational movement between said magnetic field and said magnetic flux sensor.

2. The sensor of claim 1, wherein said ring segment has a semi-annular configuration.

3. The sensor of claim 1, wherein said ring segment has an inwardly facing side surface and an outwardly facing side surface, said side surfaces extending between a pair of end surfaces, said end surfaces arranged in a substantially parallel relationship.

4. The sensor of claim 3, wherein said end surfaces extend along a common plane.

5. The sensor of claim 4, wherein said common plane intersects a central axis of said ring segment.

6. The sensor of claim 4, wherein said direction of magnetization is arranged substantially parallel to said common plane.

7. The sensor of claim 3, wherein said side surfaces are circumferential surfaces, said direction of magnetization being arranged substantially parallel to a tangent line drawn to the midpoint of said outwardly facing circumferential surface.

8. The sensor of claim 3, wherein said side surfaces are circumferential surfaces, said direction of magnetization being arranged substantially normal to a central radial axis of said ring segment.

9. The sensor of claim 1, wherein said ring segment defines an open inner region, said direction of magnetization extending laterally across said open inner region.

10. The sensor of claim 1, wherein said direction of magnetization extends along an axial length of said ring segment.

11. The sensor of claim 1, wherein said direction of magnetization extends generally along a diametric dimension of said ring segment.

12. The sensor of claim 1, wherein said direction of magnetization extends along an arc length of said ring segment.

13. The sensor of claim 1, further comprising an outer loop pole piece surrounding said magnet.

14. The sensor of claim 13, wherein said ring segment has an outer circumferential surface spaced from an inner circumferential surface of said outer loop pole piece to define an air gap, said magnetic field extending across said air gap, said magnetic flux sensor disposed within said magnetic field to sense varying magnitudes of magnetic flux density during relative rotational movement between said magnetic field and said magnetic flux sensor.

15. The sensor of claim 13, wherein said ring segment has an outer circumferential surface positioned proximately adjacent an inner circumferential surface of said outer loop pole piece, said ring segment having an inner circumferential surface defining an open inner region, said magnetic field extending across said open inner region, said magnetic flux sensor disposed within said magnetic field to sense varying magnitudes of magnetic flux density during relative rotational movement between said magnetic field and said magnetic flux sensor.

16. The sensor of claim 13, further comprising an inner loop pole piece disposed within said outer loop pole piece to define a spacing therebetween, said ring segment disposed within said spacing.

17. The sensor of claim 16, wherein said ring segment has an inner circumferential surface positioned proximately adjacent an outer circumferential surface of said inner loop pole piece, said ring segment having an outer circumferential surface spaced from an inner circumferential surface of said outer loop pole piece to define an air gap, said magnetic field extending across said air gap, said magnetic flux sensor disposed within said magnetic field to sense varying magnitudes of magnetic flux density during relative rotational movement between said magnetic field and said magnetic flux sensor.

18. The sensor of claim 16, wherein said ring segment has an outer circumferential surface positioned proximately adjacent an inner circumferential surface of said outer loop pole piece, said ring segment having an inner circumferential surface spaced from an outer circumferential surface of said inner loop pole piece to define an air gap, said magnetic field extending across said air gap, said magnetic flux sensor disposed within said magnetic field to sense varying magnitudes of magnetic flux density during relative rotational movement between said magnetic field and said magnetic flux sensor.

19. The sensor of claim 1, wherein said magnetic field is unbalanced relative to a central radial axis of said ring segment.

20. A magnetic position sensor, comprising:
    an arc-shaped magnet having a curved surface defining an open inner region, said magnet being polarized in a direction of magnetization extending laterally across said open inner region to generate a magnetic field; and
    a magnetic flux sensor disposed within said magnetic field and operable to sense varying magnitudes of magnetic flux density in directions substantially normal to said curved surface of said magnet during relative rotational movement between said magnetic field and said magnetic flux sensor.

21. The sensor of claim 20, wherein said arc-shaped magnet has an inwardly facing side surface and an outwardly facing side surface, said side surfaces extending between a pair of end surfaces, said end surfaces extending along a common plane.

22. The sensor of claim 21, wherein said common plane intersects a central axis of said arc-shaped magnet.

23. The sensor of claim 21, wherein said direction of magnetization is arranged substantially parallel to said common plane.

24. The sensor of claim 21, wherein said direction of magnetization is arranged substantially normal to a central radial axis of said arc-shaped magnet.

25. A magnetic position sensor, comprising:
- a magnet comprising a semi-annular ring having a diametric dimension and a circumferential surface, said magnet being polarized in a direction of magnetization extending generally along said diametric dimension to generate a magnetic field; and
- a magnetic flux sensor disposed within said magnetic field and operable to sense varying magnitudes of magnetic flux density in directions substantially normal to said circumferential surface of said magnet during relative rotational movement between said magnetic field and said magnetic flux sensor.

26. The sensor of claim 25, wherein said magnet has an inwardly facing circumferential side surface and an outwardly facing circumferential side surface.

27. The sensor of claim 26, wherein said circumferential side surfaces extend between a pair of end surfaces arranged along a common plane, said direction of magnetization being arranged substantially parallel to said common plane.

28. The sensor of claim 27, wherein said common plane intersects a rotational axis of the sensor.

29. The sensor of claim 26, wherein said direction of magnetization is arranged substantially parallel to a tangent line drawn to the midpoint of said outwardly facing circumferential side surface.

30. The sensor of claim 26, wherein said magnetic flux sensor is positioned adjacent one of said circumferential side surfaces of said magnet.

31. The sensor of claim 26, wherein said magnetic flux sensor defines a sensing plane arranged to continuously face one of said circumferential side surfaces of said magnet during said relative rotational movement between said magnetic field and said magnetic flux sensor.

32. The sensor of claim 25, wherein said magnetic flux sensor is positioned adjacent a rotational axis of the sensor.

33. The sensor of claim 25, wherein said direction of magnetization is arranged substantially normal to a central radial axis of said semi-annular ring.

34. The sensor of claim 25, further comprising an outer loop pole piece surrounding said magnet.

35. The sensor of claim 34, further comprising an inner loop pole piece disposed within said outer loop pole piece to define a spacing therebetween, said magnet disposed within said spacing and spaced from one of said inner and outer loop pole pieces to define an air gap, said magnetic field extending across said air gap, said magnetic flux sensor disposed within said magnetic field to sense varying magnitudes of magnetic flux density during said relative rotational movement between said magnetic field and said magnetic flux sensor.

\* \* \* \* \*